UNITED STATES PATENT OFFICE.

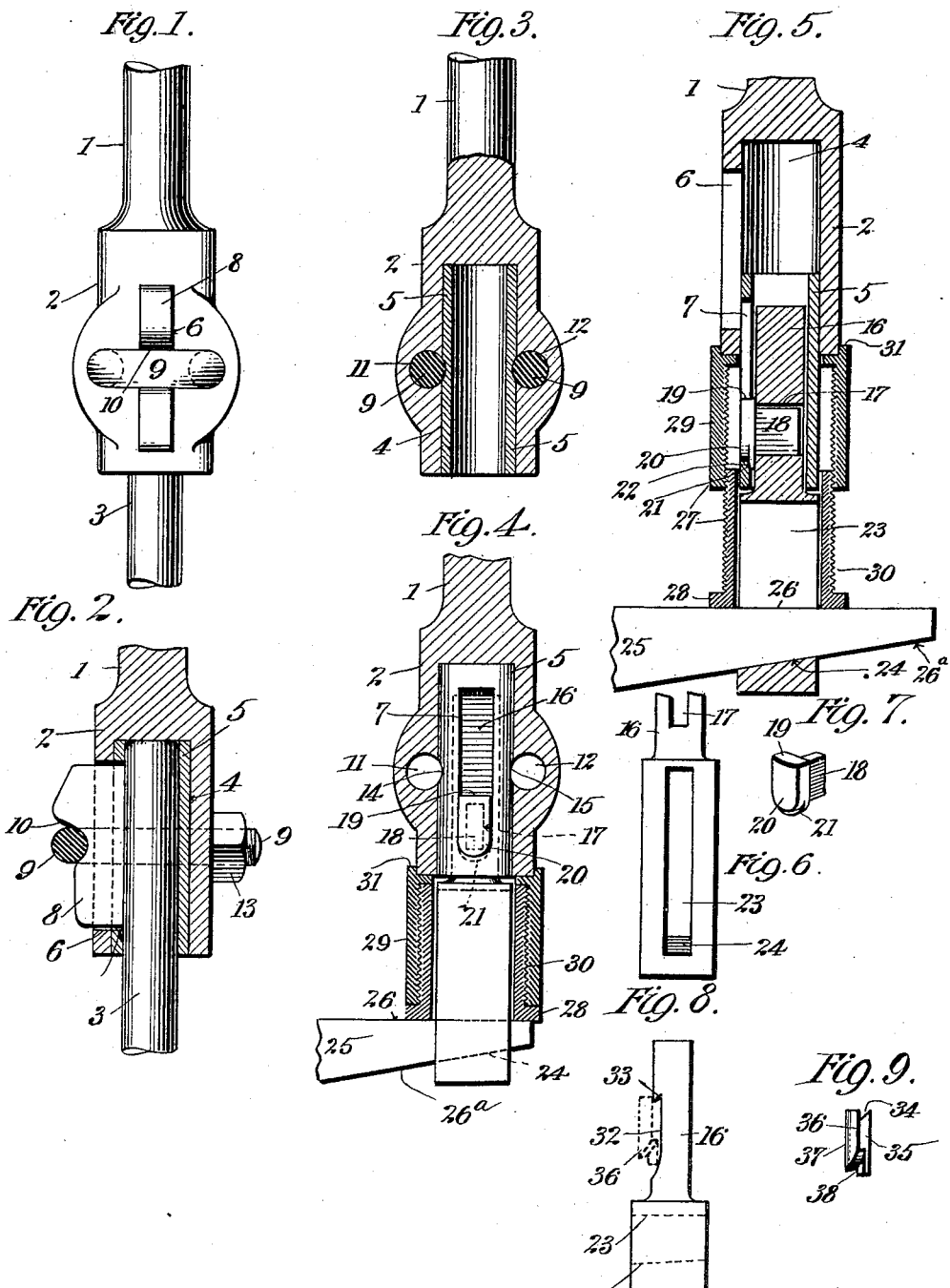

GEORGE M. COURSEN, OF PURDYS, NEW YORK.

DEVICE FOR EXTRACTING BUSHINGS.

No. 902,475.  Specification of Letters Patent.  Patented Oct. 27, 1908.

Application filed February 1, 1907. Serial No. 355,321.

*To all whom it may concern:*

Be it known that I, GEORGE M. COURSEN, a citizen of the United States, residing at Purdys, Westchester county, State of New York, have invented certain new and useful Improvements in Devices for Extracting Bushings, of which the following is such a full, clear, and exact description as will enable anyone skilled in the art to which it appertains to make and use the same, reference being had to the accompanying drawings, forming part of this specification.

In the use of rock drills in which there is employed a chuck for holding the drilling-tool, the chuck is provided with a bushing made of hard steel which is forced into the socket in the end of the chuck. This bushing is subjected to extremely hard usage and soon becomes damaged so that it has to be removed and replaced with a new bushing. In the removal of this bushing much difficulty has been experienced and very crude methods have been resorted to in the way of mutilating or breaking up the bushing by chisels or by heating the drill chuck so as to take out the bushing more easily. The methods thus resorted to of removing this bushing are manifestly objectionable and have many drawbacks, one particular drawback being that the drill chuck is often mutilated or badly injured, its temper being drawn where heat is used, and furthemore such methods require considerable time to completely remove the bushing.

The objects of my invention are to overcome the above noted drawbacks and to provide simple and effective means for removing the bushing without in any way injuring the drill chuck.

While the invention is not, of course, limited to extracting bushings from the drill-chucks, I have, however, illustrated it in that connection.

With these and other objects in view, my invention consists in the various novel and peculiar arrangements and combinations of the several different parts of the device, all as hereinafter fully set forth and then pointed out in the claims.

I have illustrated types of my invention in the accompanying drawings, wherein;

Figure 1 is a side view of the chuck of an ordinary rock-drill with the piston bar or rod shown as broken away and with the drilling tool which is mounted in the chuck also shown as broken away. Fig. 2 is a central longitudinal sectional view of the parts shown in Fig. 1, the section being taken in the plane of the chuck-key. Fig. 3 is a central longitudinal sectional view of the parts shown in Fig. 1, and at right angles to the plane of the section of Fig. 2, but with the drilling tool omitted. Fig. 4 is a central longitudinal sectional view on the same plane as that shown in Fig. 3 and with the drilling tool, the U-bolt and chuck-key omitted, and with my extracting device inserted in position for beginning the extraction of the bushing. Fig. 5 is a central longitudinal sectional view of the parts shown in Fig. 4, and with the different parts of the extracting device shown in different relations as the bushing has been partially extracted and the fulcrum or wedging collars having been expanded. Fig. 6 is a side view of the pulling bar of the extracting device, shown as detached. Fig. 7 is a perspective view of the locking member by which the pulling bar is locked with the slotted bushing, the member being shown as detached. Fig. 8 shows a modified form of the pulling bar and Fig. 9 shows a modified form of the locking member which coöperates with the form of locking bar shown in Fig. 8.

In the accompanying drawings in which like numbers of reference designate like parts throughout, 1 is the piston bar or rod of an ordinary steam rock-drill, the outer end of which is provided with a drill-chuck 2, in which is secured the drilling tool 3. The drill-chuck is provided with a longitudinally extending socket 4, in which is inserted the steel bushing 5, which is fitted to the socket and driven therein so as to be securely held in position by a driven fit. The side of the drill chuck is provided with a slot 6 which registers with a slot 7 in the side of the bushing and through these two slots extends the chuck key 8, (see Figs. 1 and 2) which key engages the side of the drill tool 3, exposed through the slots, and is drawn with great force against the same by means of a U-bolt 9 which spans the chuck key, passing through a depression 10 in the back thereof and extends down through the bolt holes 11 and 12, respectively, in opposite sides of the drill chuck, the protruding screw-threaded ends of the U-bolt being provided with nuts 13 for bolting the parts together. It will be noted that the bushing 5 is also held in its socket by means of the cut away or depressed places 14 and 15, upon the exterior thereof and which constitutes a portion of the bolt holes 11 and 12, so that the legs of the U-bolt tend to still further secure the bushing in place. The parts thus described are well-known in the construction of rock-drills, and in the use of this construction there frequently arises the necessity of removing the bushing which is subjected to very severe wear and has to be replaced. As above pointed out, it has heretofore been the custom to use some sort of a tool or chisel to break or cut out the bushing and in some cases the chuck itself has been heated in order to facilitate removing the bushing by such means. In my present invention, I dispense with both of these methods of removing the bushing and provide a simple and efficient device for gradually drawing the bushing endwise out of the chuck, and which I will now describe.

The pulling bar 16 is of such shape and size as to be easily inserted within the outer end of the bushing 5 so that a portion thereof projects from the open end of the bushing and it is provided at a suitable point thereof with a slot 17 for receiving the stem or body 18 of a locking piece 19 which is also provided with a flat head 20 which is adapted to fit in the forward rounded end of the slot 7 in the bushing when the pulling bar is inserted in place within the bushing, as shown in Fig. 4. The forward end of the head 20 is provided with a lip 21 and the bushing itself is provided with an undercut part 22 at the forward end thereof (Figs. 4 and 5), and when the bar is drawn forward the lip 21 fits well under the cut away part 22 and prevents the locking member from riding up out of place when great tension is exerted upon the bar. In order to lock the pulling bar to the slotted bushing, the bar is inserted far enough in the bushing to bring the slot 17 of the bar well within the slot 7 in the bushing, whereupon the locking member is inserted by hand into the position shown in Fig. 4, and this serves to lock the parts together.

Near its outer end the pulling bar is provided with a wedge opening or slot 23, the outer end of which is inclined to the axis of the bar as indicated at 24 (Figs. 4, 5 and 8). This slot is adapted to receive a wedge 25 the inner and straight edge 26 of which engages the outer face of a fulcrum or wedging part 27 which is placed between said wedge and the outer end of the drill chuck 2 while the outer inclined face 26ª engages the incline 24 of the opening 23. This fulcrum or wedging part 27 is composed of two collars 28 and 29, which are secured together by means of screw-threaded joint 30, so that they may be expanded and contracted, the inner collar being provided with an annular flange 31, which fits over the end of the drill-chuck to hold the collars in place.

After the parts of the extracting device are placed together as shown in Fig. 4 with the fulcrum collar 27 contracted to its smallest size, and the drill chuck is firmly held by any well-known means, such as a vise or the like, the wedge 25 is then driven in by means of a hammer, and as there is considerable distance between the back face 26 of the wedge and the outer end of the bushing 5, the driving in of the wedge serves to draw outwardly the pulling-bar 16 together with the bushing 5 which is locked thereto by means of the locking member 19, and this action continues until the outer end of the bushing meets the back face 26 of the wedge, whereupon the wedge is withdrawn and the fulcrum or expanding part 27 is expanded by opening out the screw joint between the two collars 28 and 29, as shown in Fig. 5. The wedge 25 is then re-inserted and again driven in, which action continues to withdraw the pulling-bar and the bushing as previously described. This operation is continued until the bushing is drawn out sufficiently far to easily remove it. In this connection it will be noted that the fulcrum or wedging collars 28 and 29 may be made of any desired size and proportion, and the wedging slot 23 in the pulling bar may be made as large or as small as desired, so long as there is a sufficient range of adjustment to draw the bushing outwardly far enough to extract it.

In Fig. 8, I show a modified form of the pulling bar 16, and in which a notch 32 is used instead of the slot, as shown in the other form, and the rear end of the notch is under-cut at 33 to receive a similarly shaped part 34 on the body or stem 35, of the locking-piece 36, shown in Fig. 9. This locking-piece 36 has a flat rounded head 37, with a lip 38 at the forward end, as described in the other form and which operates in the same way, its operative position on the locking-bar being indicated in dotted lines in Fig. 8. When the locking member 36 is seated in the notch 32 on the locking-bar, as shown in Fig. 8, the under-cut parts 33 and 34 on the bar and locking member, respectively, serve to prevent the rear end of the locking member from rising up during the pulling action, the forward lip 38 taking under the forward end of the slot in the bushing, serving to keep down the forward end of the member.

I am aware of U. S. Letters Patent No. 867,181, granted Sept. 24, 1907 to Joseph Zimms, for bushing pullers and I make herein claims 12, 13, 14, 15, 16, 17 and 18, identical with claims 1, 2, 4, 5, 6, 8, and 10, respectively, of said Patent No. 867,181, having been awarded priority of invention of each of the said claims, in an interference proceeding duly declared and determined by the U. S. Patent Office between this application and the said Zimms patent.

Having thus described my invention what

I claim and desire to secure by Letters Patent is:—

1. In a bushing puller, the combination of a pulling bar adapted to be inserted within the bushing and means for connecting the two together, an expansible abutment device adapted to be placed against the bushing, and means adapted to engage said pulling bar in said abutment and acting to draw the bar outwardly to extract the bushing.

2. A device for extracting a bushing, the same comprising a pulling bar adapted to be inserted within the bushing, means for connecting said bar and bushing together, a fulcrum or abutment located approximately near the end of said bushing toward which it is drawn, and a non-rotary wedge adapted to engage both said pulling bar and abutment and to be driven between the same transversely of said pulling bar to draw the bar outwardly.

3. A device for extracting a bushing, the same comprising a pulling-bar adapted to be inserted within the outer end of the bushing, means for connecting said bar and bushing together, means for engaging the said pulling bar and operating to wedge the same outwardly to extract the bushing, and an expansible fulcrum part adapted to be interposed between the part in which the bushing is mounted and said wedging means.

4. A device for extracting a bushing, the same comprising a pulling-bar adapted to be inserted within the outer end of the bushing, means for connecting said bar and bushing together, means for engaging the said pulling-bar and operating to wedge the same outwardly to extract the bushing, and an expansible fulcrum part adapted to be interposed between the part in which the bushing is mounted and comprising collars jointed to each other and capable of being expanded and contracted longitudinally.

5. A device for extracting a bushing, the same comprising a pulling-bar adapted to be inserted within the outer end of the bushing, means for connecting said bar and bushing together, means for engaging the said pulling-bar and operating to wedge the same outwardly to extract the bushing, and an expansible fulcrum part adapted to be interposed between the part in which the bushing is mounted and comprising collars jointed to each other and capable of being expanded and contracted longitudinally, the innermost collar being provided with a flange adapted to fit over the end of a drill-chuck or the part carrying the bushing.

6. A device for extracting a bushing, the same comprising a pulling bar adapted to be inserted within the bushing, means for connecting said bar and bushing together, the said pulling bar being provided with a wedge-slot, a wedge adapted to be driven in said wedge-slot to draw the pulling bar endwise, and a fulcrum or abutment adapted to be interposed between the inner face of said wedge and a fixed part on the member carrying said bushing.

7. A device for extracting a perforated or slotted bushing from a slotted drill-chuck or the like, the same comprising a pulling bar adapted to be inserted within the outer end of the bushing and provided with a slot for locking with the locking member, a detachable locking member provided with a head adapted to engage the forward end of the slot in the bushing, said locking member being placed in such locking position through the slot in said chuck and bushing, respectively, means for gradually pulling the bar outwardly to extract the bushing, and means for preventing said locking member from disengaging itself from said locking bar and the slot in the bushing during the pulling action on the bar.

8. A device for extracting a perforated or slotted bushing from a slotted drill-chuck or the like, the same comprising a pulling bar adapted to be inserted within the outer end of the bushing and provided with a slot for locking with the locking member, a detachable locking member provided with a head having a forwardly extending lip for engaging the forward end of the slot in the bushing and taking under the same, said locking member being placed in such locking position through the slot in said chuck and bushing, respectively, and means for gradually pulling the bar outwardly to extract the bushing.

9. A device for extracting a bushing, the same comprising a bar adapted to be inserted within the bushing, means for connecting said bar and bushing together, means acting to draw the bar outwardly, a device against which said means for drawing the bar acts and adjustable angularly to said bar and causing the bar to be drawn outwardly through different distances according to the angular position or adjustment of said device.

10. A device for extracting a bushing, the same comprising a bar adapted to be inserted within the bushing, means for connecting said bar and bushing together, means acting to draw the bar outwardly, a device against which said means for drawing the bar acts and adapted to be interposed between said means and the part containing the bushing and adjustable angularly relatively to said bar and causing the bar to be drawn outwardly through different distances according to the angular position or adjustment of said device.

11. A device for extracting a bushing, the same comprising a bar adapted to be inserted within the bushing, means for connecting said bar and bushing together, means acting to draw the bar outwardly, a sleeve adapted to be placed between said means for drawing the bar and the part containing the bushing and having capacity of angular adjustment relative to said bar to vary the distance which the bar can be drawn outwardly.

12. A bushing puller, comprising a central rod having a recess near one end and a slot near the other, a key for the recess projecting beyond the face of the rod, a sleeve, and a wedge interposed between one end of the slot of the rod and the sleeve.

13. A bushing puller, comprising a central rod provided with a slot near one end and a recess near the other, having an inclined portion at one end thereof, a key having an inclined end adapted to engage the inclined portion of the recess, a sleeve, and a wedge interposed between one end of the slot of the rod and the sleeve.

14. A bushing puller, comprising a central rod provided with a recess near one end and a slot near the other, said recess having a plane bottom with an inclined portion in respect thereto at one end thereof, and a curved portion at the other end, a key having a curved portion at one end and an inclined portion at the other adapted to respectively engage the corresponding portions of the recess of the rod, a sleeve, and a wedge interposed between one end of the slot of the rod and the sleeve.

15. A bushing puller comprising a rod having means whereby it may be engaged with the bushing, a sleeve embracing the rod, and a non-rotatable wedge whereby the rod is displaced relatively to the sleeve.

16. A bushing puller comprising a rod having means whereby it may be engaged with the bushing, said rod being provided at the opposite end with a slot, a sleeve to embrace said rod, and a wedge in said slot whereby the rod is moved relatively to said sleeve.

17. In a bushing puller, the combination, with the rod having a slot, and the wedge operating in said slot, of a device mounted to turn on the rod and intended to be interposed between the wedge and the chuck, said device causing the rod to be driven outwardly through different distances according to the angular position of said device.

18. In a bushing puller, a rod to withdraw the bushing having a recess provided with an inclined end-portion, and a key seated in said recess and having an inclined end to engage said inclined portion, said key having a shoulder to engage in the slot in the bushing.

In testimony whereof, I have hereunto set my hand in the presence of the two subscribing witnesses.

GEORGE M. COURSEN.

Witnesses:
WILLIS FOWLER,
THOMAS F. MCDONALD.